Feb. 25, 1941.                C. RETSCHY                 2,232,802
                        PISTON FOR POWER ENGINES
                           Filed July 7, 1938
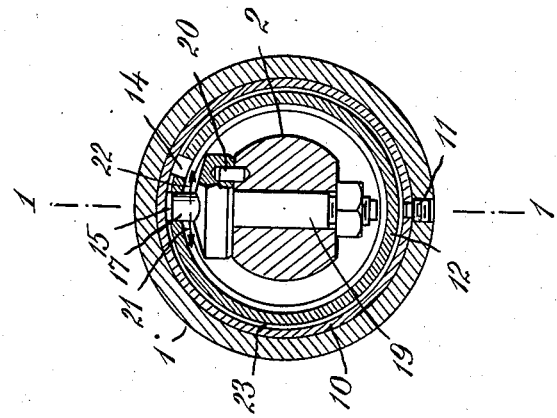
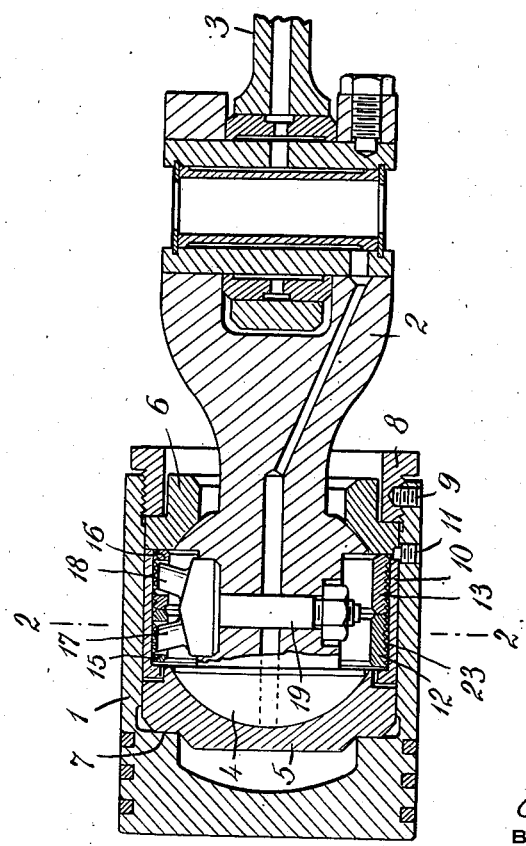
INVENTOR
Curt Retschy
BY
Pennie, Davis, Marvin & Edmonds
ATTORNEYS Patented Feb. 25, 1941

2,232,802

UNITED STATES PATENT OFFICE 2,232,802

PISTON FOR POWER ENGINES

Curt Retschy, Winterthur, Switzerland, assignor to Sulzer Freres, Societe Anonyme, Winterthur, Switzerland Application July 7, 1938, Serial No. 217,953
In Switzerland July 19, 1937

6 Claims. (Cl. 309—20)

This invention relates to pistons for power engines and the like, and has for its object the provision of an improved piston and means for connecting the piston to its connecting rod. The improved apparatus of the invention comprises a piston having a ball joint between the piston and its connecting rod which permits movement of the piston in all directions, and means are provided for utilizing the swinging or pivoting movement of the connecting rod to impart to the piston a continuous rotation with respect to the connecting rod, including expandable rings mounted in the piston and means for alternately bringing the rings into gripping and into slipping engagement with the piston.

The accompanying drawing illustrates a construction and arrangement of apparatus in accordance with the invention, in which Fig. 1 is a longitudinal section along the line 1—1 of Fig. 2, and Fig. 2 is a cross section along the line 2—2 of Fig. 1.

The piston 1 of the apparatus illustrated is of the type especially adapted for an opposed-piston combustion engine, and is connected to the connecting rod 2 which transmits the power of the piston through a balance lever 3 to an additional connecting rod and a crankshaft (neither of which is shown). The connecting rod 2 has a ball head 4 which is in coupled engagement with two ball sockets 5 and 6 of the piston. The ball socket 5 lies on a shoulder 7 of the piston 1, and the ball socket 6 rests against the ring screw or threaded sleeve 8 which is screwed into the lower end-portion of the piston 1. By adjustment of the ring screw 8 the necessary bearing play of the ball pivot in its sockets can be obtained exactly. After the adjustment, the ring screw can be secured against rotation by a threaded screw pin 9. The connecting rod 2 is thus mounted so that it can pivot in all directions with respect to the piston and is also rotatable around its own axis.

A cylindrical bushing 10 is inserted in the piston and secured against turning by means of a threaded screw pin 11. On the inner surface of the bushing 10 rest two expandable split rings 12 and 13, both of which are split or slotted at point 14 and coaxial with respect to the piston. The diameter of the split rings is made somewhat larger than the inner diameter of the bushing 10 so that they, after insertion in the bushing, exercise a pressure on the inner surface thereof. In other words, each split ring is under stress causing it to be in pressed engagement with the bushing or sleeve 10. Each split ring has an opening 15 and 16 near the split 14, in which control pins 17 and 18, respectively, of the bolt 19 are inserted. The bolt 19 is secured against turning with respect to the connecting rod 2 by means of a pin 20. The bolt 19 is preferably coaxial with the pivotal center of the rod in the ball and the pins 15 and 16 are spaced from or eccentric with respect to the said pivotal center.

The pivoting movements of the connecting rod that occur during operation are transmitted to the control pins 17 and 18 and to the split rings 12 and 13. If the control pin 17 displaces the split ring 12 in the direction of the arrow 21, then the ring tends to expand and as a result of the increased stress frictionally engages the bushing 10 and the piston 1, thus imparting to the piston a rotating movement. If, conversely, the control pin 17 is displaced in the direction of the arrow 22, it will contract the split ring lessening the stress and loosen it from the bushing 10. The bushing 10 and the piston will then not participate in the movement. The inner surface of the bushing 10 will then slide over the outer surface of the split ring.

The control pin 18 makes the same movements as the control pin 17, but so displaced as regards time that the split ring 13 is loosened when the ring 12 is expanded and vice versa. In other words, each ring is alternately brought into gripping and into slipping engagement with the bushing 10. Thus the piston will be driven constantly in the direction of the arrow 21 by the control pins 17 and 18 so that it will also receive a turning motion in the direction of the arrow 21 during its stroke movement.

The arrangement of the split rings 12 and 13, bushing 10 and the eccentrically mounted control pins 17 and 18 comprises a friction clutch coupling the piston to the rod and enabling swinging movement of the rod to rotate the piston.

In order to prevent the undesirable effect of the oil film between the split rings 12 or 13 and the bushing 10, grooves 23 are turned in the rings so that even with slight pressures the oil film will be suppressed.

The advantage of the turning movement superposed on the axial movement of the piston causes the ball pivot to be ground in on all sides giving an exact ball surface. If foreign substances get between the slide surfaces of the bearing, either at the ball joint or at the cylinder slide surface, they will not remain in a fixed or constant path, but will be brought to new points of the slide surface. The foreign substance will be rubbed away in very short time so that it cannot injure the bearing surface.

The same effect obtained by split rings can also be obtained by clamping rings placed around the cylindrical part of the piston which receive an oscillating turning movement through the swing movement of the connecting rod. The oscillating turning movement of the clamping rings is then converted into a steady continuous turning movement of the piston. Furthermore, bevel gears may be used, one of which could be fastened to the connecting rod and another to the piston, one of the gears receiving a pawl drive so that by the pawl the piston would be driven in steadily continuous turning movement by the oscillating movement of the connecting rod.

The apparatus according to the invention may be so formed and operated that, in an engine having, for example, a speed of 1500 revolutions per minute, the piston may rotate 8 to 10 times per minute. The apparatus described permits a flexible drive of the piston so that when too great resistances to the turning movement of the piston occur, no part is excessively loaded but the turning movement merely ceases. It is particularly important in this connection that a periodicity cannot result, but new positions of the piston in the cylinder result.

The improved apparatus of the invention may also be applied to steam engines, pumps, compressors and other piston engines.

The flexible drive has a special advantage because the flexible ratchet couplings, for example, the clamping rings, split rings, ratchet locking, etc., do not transmit too high forces to the pistons so that no unpermissible loads occur. In particular, the accelerating or retarding forces in the intermittent drive will not receive too high values. The invention is especially applicable in the case of engines with high speeds, and high bearing loads or stresses.

I claim:

1. The combination with a piston which comprises a connecting rod for the piston, a ball joint connection between the piston and the rod, two expandable rings mounted in the piston arranged to effect frictional engagement with the piston, and pivotal connecting means in engagement with the ball and with the rings responsive to the swinging movement of the rod for alternately expanding and contracting the rings bringing them alternately into gripping and into slipping engagement with the piston.

2. The combination with a piston which comprises a connecting rod for the piston, a ball at the piston end of the rod, seating members in the piston for mounting the piston on the ball, an expandable split ring mounted inside the piston, pin means connected to the rod and to the ring near the split for expanding the ring when the rod swings, said pin means being spaced from the pivotal center of the rod and arranged to expand and contract the ring alternately into gripping and into slipping engagement with the piston.

3. The combination with a piston which comprises a connecting rod for the piston, a ball at the piston end of the rod, seating members in the piston for mounting the piston on the ball, a sleeve secured to the piston and between the seating members, two expandable split rings coaxially mounted in the sleeve, and pin means on the ball in operative engagement with the rings, said pin means being arranged to oscillate about the axial center of the ball as the rod is swung and bring the rings alternately into frictional gripping engagement and into slipping engagement with the sleeve, thereby rotating the piston.

4. In the combination of claim 3, grooves on the friction surfaces of the rings for suppressing the action of the oil at the friction surfaces.

5. The combination with a piston which comprises a connecting rod for the piston, a ball at the piston and of the rod, seating members in the piston for mounting the piston on the ball, a sleeve secured to the piston and between the seating members, two split rings mounted inside the sleeve under sufficient stress causing them to be in gripping engagement with the sleeve, means for alternately moving the rings in one direction to move the piston therewith and for alternately releasing them from gripping engagement causing one ring to slip in the sleeve while the other ring moves the piston, said means including two pins spaced from the pivotal center of the ball each being in engagement with one of the rings near the split, said piston being rotated by the rings as the rod swings due to reciprocation of the piston.

6. The combination with a piston which comprises a connecting rod for the piston, a ball at the piston end of the rod, seating members in the piston for mounting the piston on the ball, two split rings mounted inside the piston, means causing each ring to be in gripping engagement with the piston, means for moving one ring in one direction while it is in gripping engagement with the piston to move the piston therewith, and means for releasing the other ring from gripping engagement with the piston permitting it to slip as the piston is being moved by the other ring, said means for moving one ring in one direction and releasing the other ring being in operative engagement with and actuated by the swinging movement of the piston rod.

CURT RETSCHY.